United States Patent
Patel et al.

(10) Patent No.: US 7,434,355 B2
(45) Date of Patent: Oct. 14, 2008

(54) INFLATABLE DOCKING STATION/GARAGE FOR MARS ROVER

(75) Inventors: Vipul P. Patel, Irvine, CA (US); Al MacKnight, Lakewood, CA (US)

(73) Assignee: Honeywell International Inc., Morristown, NJ (US)

( * ) Notice: Subject to any disclaimer, the term of this patent is extended or adjusted under 35 U.S.C. 154(b) by 886 days.

(21) Appl. No.: 10/733,432

(22) Filed: Dec. 10, 2003

(65) Prior Publication Data

US 2005/0126081 A1    Jun. 16, 2005

(51) Int. Cl.
 *E04B 1/34* (2006.01)
(52) U.S. Cl. .......................... 52/2.11; 52/173.3; 52/2.22
(58) Field of Classification Search .................. 52/2.16, 52/2.13, 2.22, 2.11, 173.3; 47/17
See application file for complete search history.

(56) References Cited

U.S. PATENT DOCUMENTS

| | | | | |
|---|---|---|---|---|
| 4,567,696 A | * | 2/1986 | Malet | 52/2.25 |
| 4,819,389 A | * | 4/1989 | Kihn | 52/2.21 |
| 4,991,363 A | | 2/1991 | Randmae | |
| 5,058,330 A | | 10/1991 | Chow | |
| 5,177,479 A | * | 1/1993 | Cotton | 340/932.2 |
| 5,335,447 A | * | 8/1994 | Bee | 47/17 |
| 5,427,356 A | * | 6/1995 | Krotov et al. | 254/324 |
| 5,432,508 A | * | 7/1995 | Jackson | 340/932.2 |
| 5,566,512 A | | 10/1996 | Page | |
| 5,897,156 A | | 4/1999 | Hayard et al. | |
| 6,029,404 A | * | 2/2000 | Lewis | 52/2.18 |
| 6,502,030 B2 | * | 12/2002 | Hilleary | 701/207 |
| 6,532,404 B2 | | 3/2003 | Colens | |
| 6,547,189 B1 | | 4/2003 | Raboin et al. | |
| 6,968,195 B2 | * | 11/2005 | Nowak | 455/456.2 |

FOREIGN PATENT DOCUMENTS

JP    2000 088598    3/2002

* cited by examiner

*Primary Examiner*—Basil Katcheves
(74) *Attorney, Agent, or Firm*—Oral Caglar, Esq.

(57) ABSTRACT

An inflatable docking station for a Mars roving vehicle (Mars rover) provides a recharging station as well as a storage facility for the Mars rover during adverse environmental conditions. The docking station/garage allows for extended operational life for the Mars Rover, allows for the Mars rover to operate at the polar regions of Mars, where extreme cold conditions restrict rover operation, and provides for a warmer habitat for the Mars rover. Conventional planetary roving vehicles only be deployed from the warmer equator region of the planet surface. However, these roving vehicles may never explore the polar regions because the roving vehicle may not have enough stored power. The docking station/garage provides a remote outpost for, among other things, storing and recharging the Mars Rover to allow it to reach more remote areas.

16 Claims, 3 Drawing Sheets

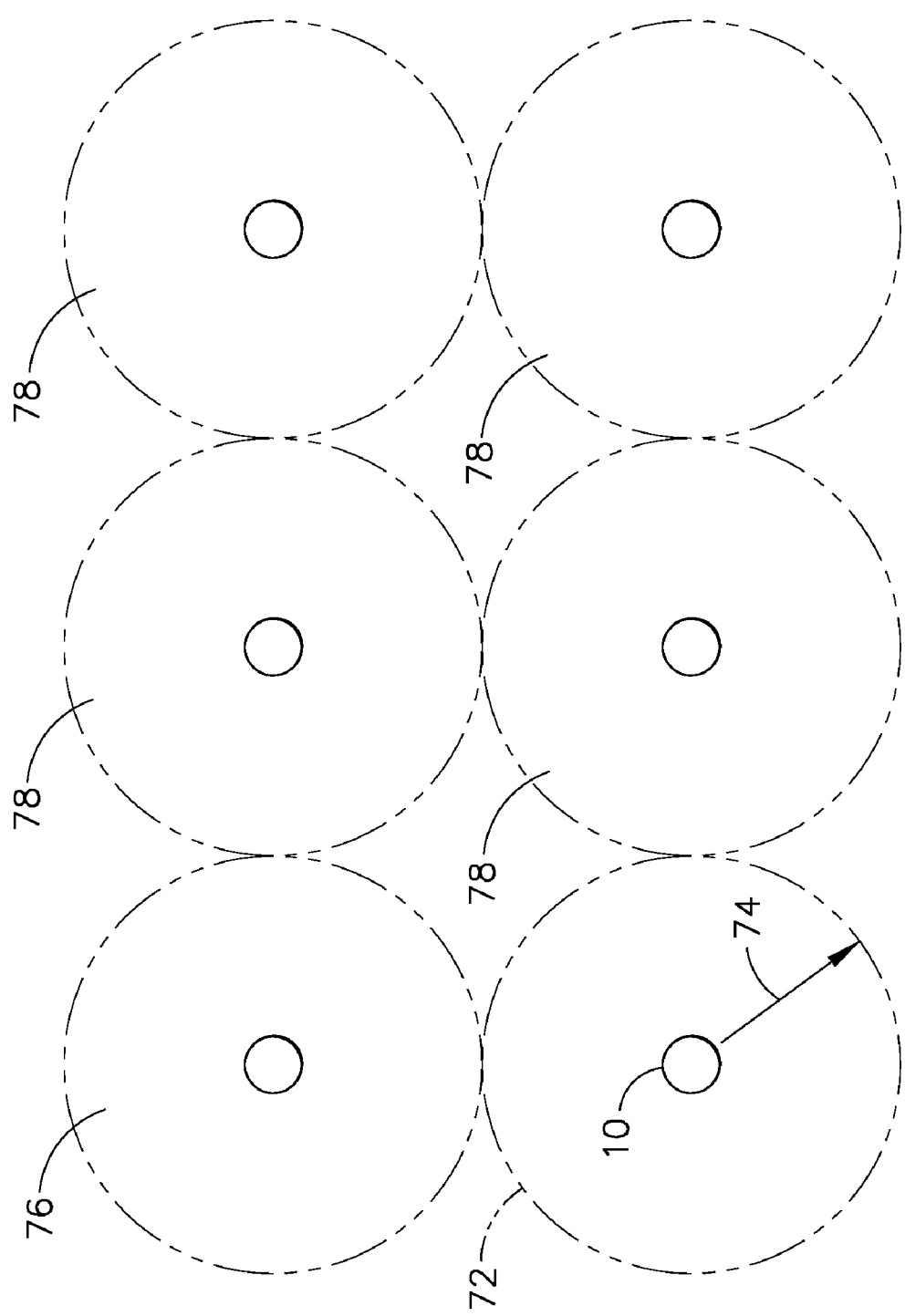

INFLATABLE DOCKING STATION/GARAGE FOR MARS ROVER

BACKGROUND OF THE INVENTION

The present invention generally relates to an inflatable docking station/garage and, more specifically, to an inflatable docking station/garage for storing and recharging a Mars roving vehicle.

Conventional Mars rovers are limited to operate at the equator regions of the Mars surface due to extreme environment conditions at the polar region. In addition, conventional Mars rovers contain a solar battery, thereby requiring the conventional rover to stop operation upon the setting of the sun, thus limiting the operational range of the rover.

U.S. Pat. No. 4,991,363 discloses a portable enclosure to protect a vehicle from the harmful effects of the outdoor environment. The enclosure is made of a flexible sheeting material designed to surround the vehicle. User interaction is required to set-up, open and close the enclosure. The enclosure is ventilated to minimize temperature differentials between the interior and exterior of the enclosure (abstract).

U.S. Pat. No. 5,058,330 discloses a membrane structure for lunar habitation and operation. The membrane is made up of a continuous and leak-proof fabric membrane that encapsulates the entire structure and is capable of withstanding temperatures of about −190° C. to +140° C. Lunar soil supports the bottom of the membrane. Up to ten feet of lunar soil covers the structure. The deployment of this structure requires excavation of the lunar surface and burial with lunar soil. An entrance to the interior of the structure may be maintained, however, it must be brought through an air lock entrance (col. 7, lines 44-50).

As can be seen, there is a need for an improved planetary surface docking station/garage to house a planetary roving vehicle that may be easily deployed, that may allow for recharging of the roving vehicle, and that may protect the roving vehicle from extreme cold. Such an improved structure is advantageously compact in size, for ease of delivery to the selected planet's surface (such as Mars) while being easily and remotely deployed.

SUMMARY OF THE INVENTION

In one aspect of the present invention, an inflatable docking station/garage comprises an inflator for inflating the inflatable docking station/garage upon deployment at a desired location; an interior portion suitable for housing a vehicle therein; a first communication system for communicating between the vehicle and the docking station/garage; a second communication system for communicating between a remote location and at least one of the docking station/garage and the vehicle; and an environmental control system for providing a proper environment for storing the vehicle.

In another aspect of the present invention, an inflatable docking station/garage for deployment on a planet surface comprises an inflator for inflating the inflatable docking station/garage upon deployment at a desired location; an interior portion suitable for housing a vehicle therein; a first communication system for communicating between the vehicle and the docking station/garage; a second communication system for communicating between a receiving station and at least one of the docking station/garage and the vehicle; and an environmental control system for providing a proper environment for storing the vehicle.

In yet another aspect of the present invention, an inflatable, remotely deployable facility for docking or storing a Mars roving vehicle on the surface of Mars, comprises an inflator for inflating the inflatable docking station/garage upon deployment at a desired location; an interior portion suitable for housing the Mars roving vehicle therein; a first communication system for communicating between the Mars roving vehicle and the facility; a second communication system for communicating between the Earth-based remote control station and at least one of the facility and the Mars roving vehicle; and an environmental control system for providing a proper environment for storing the Mars roving vehicle.

In a further aspect of the present invention, an inflatable docking station/garage for storing or docking a Mars rover, comprises an inflator for inflating the inflatable docking station/garage upon deployment at a desired location; an outer section, enclosed by a top portion and at least two side portions, the outer section having an opening on two opposing sides, sized to allow the Mars rover to pass therein; an inner section, attached to the outer section; a door on a portion of an exterior wall of the inner section, the door communicating the inner section with one of the two opposing sides of the outer portion, thereby allowing the vehicle to pass through the outer portion into the inner portion; a first communication system for communicating between the Mars rover and the docking station/garage; a second communication system for communicating between the Earth-based remote control station and at least one of the docking station/garage and the Mars rover; an environmental control system for providing a proper environment for storing the Mars rover; solar panels disposed over at least a portion of an exterior surface of the docking station/garage; an energy storing system for storing electrical energy generated by the solar panels; a power box for connecting the Mars rover to electrical energy either from the solar panels or from the energy storing system; a roof portion of the docking station/garage having at least one solar panel section pivotably attached thereto, wherein when the docking station/garage is inflated, the roof portion pivotably opens to provide additional solar panel surface area; area sensors to detect the location of the vehicle and guide the vehicle to the docking station/garage when the vehicle completes a mission; guidance sensors for guiding the vehicle inside of the docking station/garage; and precision sensors for accurately positioning the vehicle at a predetermined position inside the docking station/garage.

In still a further aspect of the present invention, a method for storing and docking a planet surface roving vehicle, comprises energizing a power box located within an interior portion of a docking station/garage; guiding the roving vehicle inside the interior portion; electrically connecting the power box with the roving vehicle; and providing a proper environment within the interior portion with an environmental control system.

In another aspect of the present invention, a method of performing experiments on a surface of an astrological body in space comprises placing on the astrological body a docking station/garage that comprises an interior portion suitable for housing a vehicle therein, a first communication system for communicating between the vehicle and the docking station/garage, a second communication system for communicating at least one of the docking station/garage and the vehicle with a remote location, and an environmental control system for providing a proper environment for storing the vehicle; and sending the vehicle across the surface to conduct the experiments, wherein the vehicle contains an experiment module.

These and other features, aspects and advantages of the present invention will become better understood with reference to the following drawings, description and claims.

BRIEF DESCRIPTION OF THE DRAWINGS

FIG. 4 is a plan view showing a method of using the garage/docking station of the present invention to cover an increased surface area.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides an inflatable docking station for a roving vehicle (rover) which may provide a recharging station as well as a storage facility for the rover during adverse environmental conditions. The present invention may allow for extended operational life for the rover, allow for the rover to operate at the polar regions of an astrological body, such as Mars, where extreme cold conditions restrict rover operation, and provide for a warmer habitat for the rover.

Without the garage/docking station of the present invention, the distance from the relatively warm equator of Mars from which a roving vehicle may travel is limited. Conventional planetary roving vehicles may be deployed from the equator region of the planet surface. However, these roving vehicles may never explore the polar regions because the roving vehicle may not have enough stored power. Further, extreme weather conditions, many times reaching temperatures as cold as −225° F., at the polar regions of Mars limits the range a roving vehicle may travel without recharge. The garage/docket station may be deployed from the warmer equator region of Mars at a location toward a polar region where exploration may be desired. This deployment may allow for a roving vehicle to find shelter from extreme weather conditions while being recharged. Moreover, the garage/docking station of the present invention may also contain experiment modules that may be changed within the garage/docking station. This permits multiple experiments to be conducted from the Mars rover without requiring the rover to return to the original point of deployment at or near the planet's equator.

Figure 1:
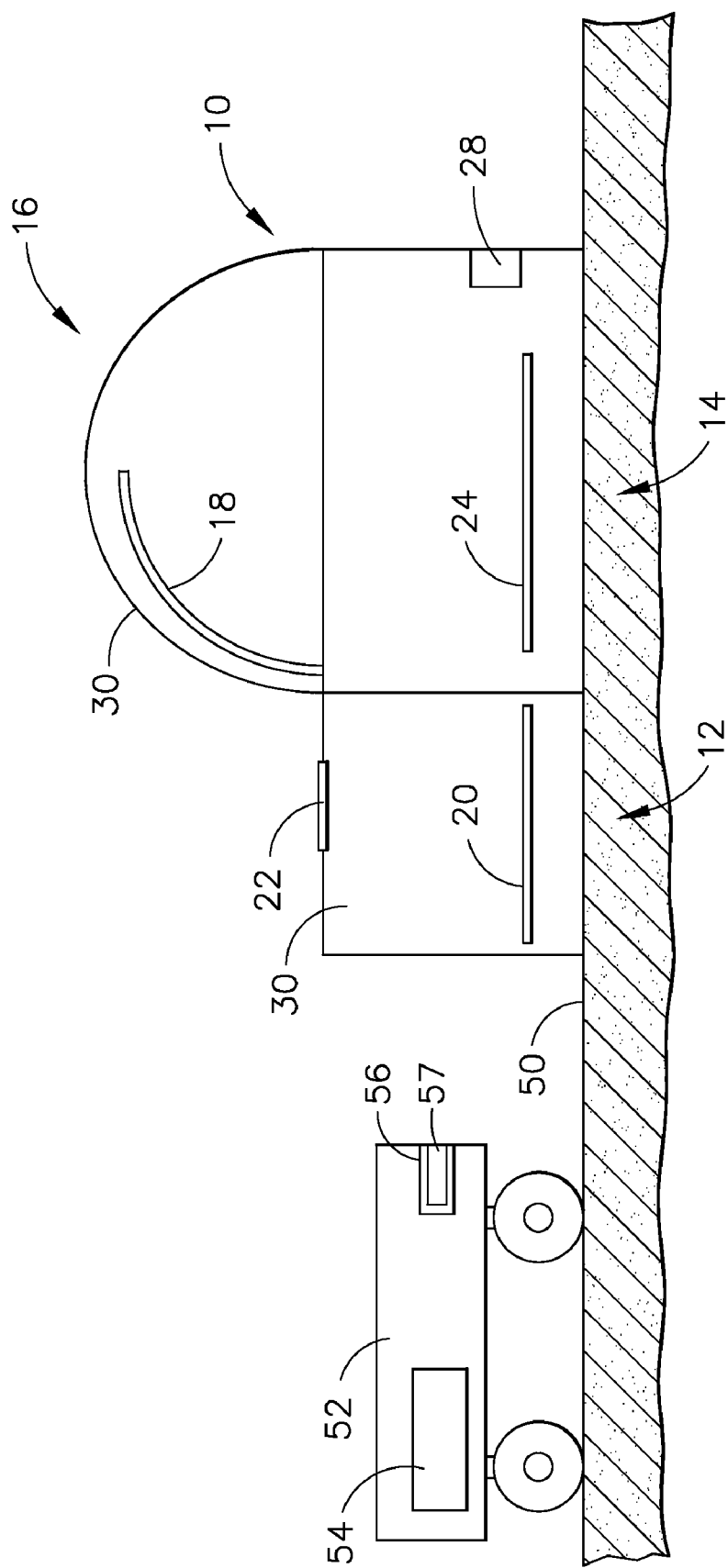
FIG. 1 is a cross-sectional side view of the garage/docking station of the present invention.

Referring to FIG. 1, there is shown a cross-sectional side view of an inflatable docking station/garage 10 of the present invention. Docking station/garage 10 may be made of two sections, an outer section 12, into which a Mars rover 52 may first enter when coming inside from a roving mission on a planet's surface 50, and an inner section 14, into which Mars rover 52 may be docked and/or recharged. An arc-shaped roof structure 16 may cover inner section 14. A door 18, when lowered, may separate inner section 14 from outer section 12. Door 18 may operate as any conventional overhead door, preferably on rollers driven by a motor (not shown). The purpose of door 18 is reduce contamination from entering inner section 14 while also protecting inner section 14 from direct wind and environmental conditions. Other types of doors may also be used, such as side-hinged swing-out doors, top-hinged swing-up doors or the like.

Outer section 12 may include area sensors 22 to locate and guide Mars rover 52 from its location on the planet's surface back to docking station/garage 10. Area sensors 22 may, for example, be infrared beams to provide a rover control system similar to that disclosed in U.S. Pat. No. 6,532,404, herein incorporated in its entirety by reference. Area sensors 22 are not limited to infrared beams, but may be a signal of any wavelength (such as radio waves) that may be sent from docking station/garage 10 and received by Mars rover 52. Outer section 12 may also include guidance sensors 20 to guide Mars rover 52 through the open rolling door 18 into inner section 14. Guidance sensors 20 may be disposed on the floor of outer section 12, thereby sensing the position of Mars rover 52 as it comes into outer section 12.

As Mars rover 52 enters inner section 14, it may contact precision sensors 24 to accurately guide the Mars rover into the correct docking position. Similar to guidance sensors 20 in outer section 12, precision sensors 24 may be disposed on the floor of inner section 14 to detect the location of Mars rover 52. Both guidance sensors 20 and precision sensors 24 may be configured in any manner to detect the position of Mars rover 52. For example, guidance sensors 20 and precision sensors 14 may be mounted on the sides 26 of docking station/garage 10 to detect the location of Mars rover 52 by any conventional means, such as infrared beams, sound waves (if there is an adequate atmosphere), lasers and the like.

Docking station/garage 10 may be made of any material that would impart weather protection on the interior contents, preferably while also insulating the interior of docking station/garage 10. Preferably, docking station/garage 10 may be made of fabric layers having an outer layer made of flexible solar cells 30 to collect solar energy. More preferably, docking station/garage 10 may be made of a self-rigidizing material that may rigidize during deployment. The self-rigidizing material may include, for example, an epoxy that uses oxygen as a catalyst to affect rigidization of the epoxy. One example of a fabric layer system that may be appropriate for docking station/garage 10 of the present invention may be found in U.S. Pat. No. 6,547,189, herein incorporated in its entirety by reference. Docking station/garage 10 may be made with a self-contained floor section (not shown) or may use the planet's surface 50 as its floor, thus saving payload size and weight when delivering docking station/garage 10 to the remote planet.

Docking station/garage 10 is preferably delivered to Mars in a non-rigid, compacted form. This compacted form may be brought to a desired location and deployed by inflating the docking station/garage with an inflation gas such as oxygen or air. Any suitable means may be used to deliver docking station/garage 10 to the desired location. For example, Mars rover 52 may be used to transport and deploy docking station/garage 10 at the desired deployment site. In this configuration, Mars rover 52 may contain onboard an inflator 56 to provide an inflation gas 57 to inflate docking station/garage 10. Inflation gas 57 may act as a catalyst to rigidize the fabric making up the structure of docking station/garage 10. Inflation gas 57 may be stored in a gas cylinder (not shown) that may be part of docking station/garage 10, or which may be externally brought to docking station/garage 10 at its point of deployment and later removed. Preferably, inflation gas 57 may flow into a space between two fabric layers that may be hermetically sealed. One such double fabric layer system useful in the present invention may be similar to that disclosed in U.S. Pat. No. 6,547,189. Alternatively, the interior may be inflated until the fabric is rigid.

Figure 2:
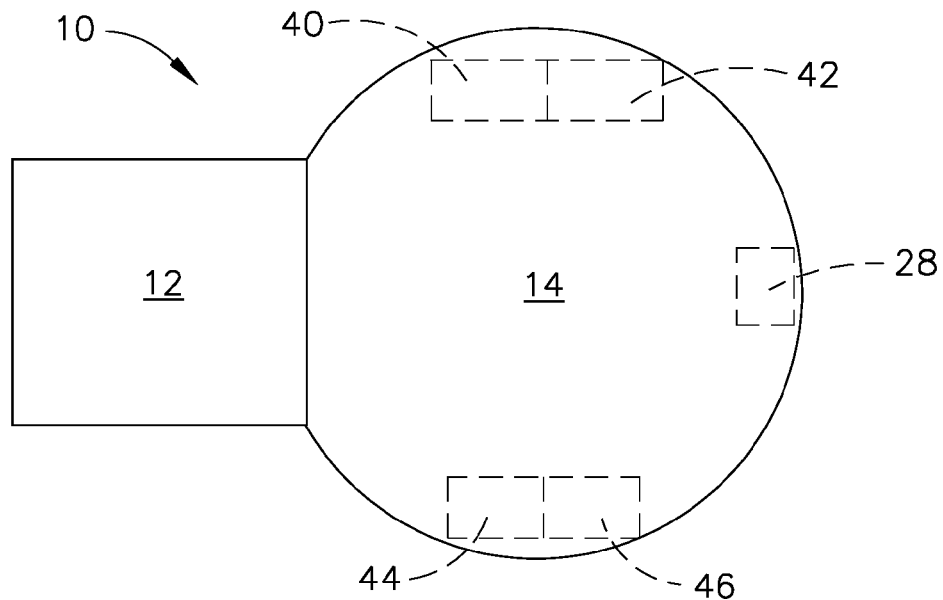
FIG. 2 is a plan view of the garage/docking station of the present invention.

Referring to FIG. 2, there is shown a plan view of docking station/garage 10 of the present invention. Inner section 14 of docking station/garage 10 may include a power storage area 40, an experiment changing station 42, a communication system 44 and an environmental control system (ECS) 46.

Power storage area 40 may store solar power captured by solar cells 30 (described below, see FIG. 3) and store the captured power for later use by a rover when the rover is docked inside docking station/garage 10. Battery storage area 40 may be electrically connected to receive power from solar cells 30 and may be electrically connected to supply power to power box 28. Battery storage area 40 may contain conventional batteries capable of multiple energizing/de-energizing cycles. These conventional batteries may include Pb acid-Ca, Li-ion, Ni—Cd and nickel metal hydride.

Referring now to FIGS. 1 and 2, experimental station 42 may be used to change experiment modules on Mars rover 52. For example, Mars rover 52 may be deployed having a particular experiment module 54 for taking certain readings over a period of time. Mars rover 52 may then dock in docking station/garage 10 and automatically or semi-automatically change one experiment module for another. Experimental station 42 may include robotics for removing the experiment module containing recorded data, and replace it with a new experiment module, for taking additional and/or different measurements. Experimental station 42 may also contain a transmitter for sending this data to an Earth-based receiving station (not shown) or to another receiver, such as one that circles the planet and optionally relays the data to Earth. In an alternate embodiment of the present invention, communications may go directly from the rover to the receiving station, bypassing docking station/garage 10. This receiving station may then, when experimental station 42 is in a semi-automatic mode, direct experimental station 42 to change one experiment module for another. When experimental station 42 is acting automatically, the old experiment module may be automatically changed out of Mars rover 52 for the next, new experiment module.

The robotics for changing experiment modules on Mars rover 52 may be convention robotics, pre-programmed to operate on a pre-defined location on experimental section 42 and on Mars rover 52. In other words, prior to deployment, experimental section 42 may contain a plurality of experiment modules. The robotics may be pre-programmed to send Mars rover 52 out with experiment module one, remove experiment module one upon the return of Mars rover 52, insert experiment module two and send Mars rover 52 out again, and so forth.

Communication system 44 may include any conventional communication means to allow Earth to communicate with docking station/garage 10 and/or with the rover, and to allow docking station/garage 10 to communicate with the Mars rover. The conventional communication means may include those similar to the communication means disclosed in U.S. Pat. Nos. 5,793,813 and 5,862,479, both of which are herein incorporated in their entirety by reference.

Environmental control system (ECS) 46 may be included in docking station/garage 10 to provide a proper atmosphere for extended life of the structure itself as well as the electronics of the rover when it is docked inside docking station/garage 10. ECS 46 may include any conventional heating means, preferably sufficient to heat inner section 14 to a temperature of, for example, about 40 to about 70° F., more preferably between about 55 and 65° F. Solar power may be used to provide heat and/or electric power to ECS 46. Additionally, a radioisotope heater (not shown) may be employed to help maintain the desired internal temperature of docking station/garage 10.

Figure 3:
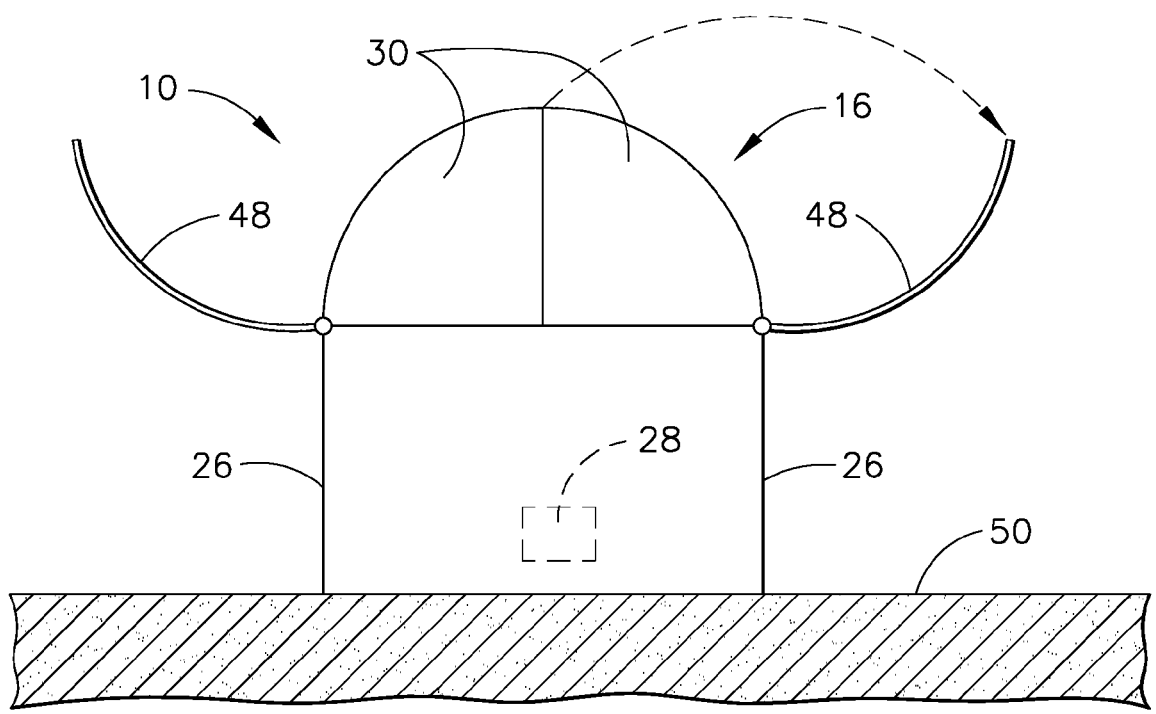
FIG. 3 is a rear view of an alternate embodiment of a garage/docking station of the present invention having an extendable solar wing panel roof structure.

Referring now to FIG. 3, there is shown a rear view of docking station/garage 10 of the present invention with solar wing panels 48 opened in a gull wing-type configuration. In this embodiment of the present invention, roof structure 16 may not only contain solar cells 30, but also solar wing panels 48 to provide additional solar collecting surface area. The energy collected by solar panels 30 and solar wing panels 48 may be used to supply current to power box 28. The Mars rover may connect to power box 28 when it is in a docked position, thereby charging the batteries of the Mars rover within a protected environment. As discussed above, the energy collected by solar panels 30 and solar wing panels 48 may also be used to charge batteries located in battery storage area 40 (see FIG. 2) within docking station/garage 10.

Referring to FIG. 4, there is shown a method for extending the range of rover 52. In one embodiment of the present invention, docking station/garage 10 may be mobile, for example, with a retractable set of wheels (not shown). Thus, docking station/garage 10 may be deployed at one location defining a first exploration area 72, allowing rover 52 to have a particular circumferential range 74. Once exploration of first exploration area 72 is complete, docking station/garage 10 may be moved to a second exploration area 76. Docking station/garage 10 may be moved from, for example, first exploration area 72 to second exploration area 76, by any known means, for example, with a set of retractable wheels as discussed above, driven rover 52 or by a wheel driving means (not shown) built into docking station/garage 10. Docking station/garage 10 may further be moved to additional exploration areas 78 as desired.

It should be understood, of course, that the foregoing relates to preferred embodiments of the invention and that modifications may be made without departing from the spirit and scope of the invention as set forth in the following claims.

We claim:

1. An inflatable garage comprising:
    walls made of a self-rigidizing material and a roof portion made of a self-rigidizing material, the roof portion having at least one solar panel integral thereto;
    an inflator for inflating said inflatable garage upon deployment at a desired location, the inflator including an inflation gas in a sealed container that makes the self-rigidizing material more rigid;
    an interior portion suitable for housing a vehicle therein;
    a first communication system for communicating between said vehicle and said garage;
    a second communication system for communicating between a remote location and at least one of said garage and said vehicle; and
    a heating and cooling system for providing a proper temperature for storing the vehicle, the heating and cooling system capable of converting a temperature in the garage of −200° F. into a temperature of between about 40 degrees and about 70 degrees Fahrenheit.

2. The inflatable garage according to claim 1, wherein: said remote location is located on the planet Earth.

3. The inflatable garage according to claim 1, further comprising:
    solar panels disposed over at least a portion of an exterior surface of said garage;
    an energy storing system for storing electrical energy generated by said solar panels; and
    a power box for connecting said vehicle to electrical energy either from said solar panels or from said energy storing system.

4. The inflatable garage according to claim 3, wherein the solar panel comprises at least one solar wing panel section, and wherein when said garage is inflated, said solar wing panel provides additional solar panel surface area.

5. The inflatable garage according to claim 3, further comprising:
   area sensors to detect the location of said vehicle and guide said vehicle to said docking station/garage when said vehicle completes a mission;
   guidance sensors for guiding said vehicle inside of said docking station/garage; and
   precision sensors for accurately position said vehicle at a predetermined position inside said garage.

6. The inflatable garage according to claim 1, further comprising area sensors to detect the location of said vehicle and guide said vehicle to said garage when said vehicle completes a mission.

7. The inflatable garage according to claim 1, further comprising guidance sensors for guiding said vehicle inside of said garage.

8. The inflatable garage according to claim 1, further comprising precision sensors for accurately position said vehicle at a predetermined position inside said garage.

9. The inflatable garage according to claim 1, wherein the vehicle contains an experiment module designed to conduct scientific experiments concerning conditions on a surface of a planet other than the planet Earth, and further comprising an experimental station for offloading the experiment module from said vehicle and loading a new experiment module onto said vehicle when said vehicle is positioned in said garage.

10. The inflatable garage according to claim 1, further comprising:
    an outer section, enclosed on a top portion and at least two side portions, said outer section having an opening on two opposing sides, sized to allow said vehicle to pass therein;
    an inner section, attached to said outer section;
    a door on a portion of an exterior wall of said inner section, said door communicating said inner section with one of said two opposing sides of said outer portion, thereby allowing said vehicle to pass through said outer portion into said inner portion.

11. The inflatable garage according to claim 1, further comprising a vehicle capable of entering and communicating with said garage.

12. The inflatable garage according to claim 1, wherein said planet surface is on the surface of Mars.

13. The inflatable garage according to claim 1, further comprising:
    area sensors to detect the location of said vehicle and guide said vehicle to said garage when said vehicle completes a mission;
    guidance sensors for guiding said vehicle inside of said docking station/garage; and
    precision sensors for accurately position said vehicle at a predetermined position inside said docking station/garage.

14. The inflatable garage according to claim 1, further comprising:
    an outer section, enclosed on a top portion and at least two side portions, said outer section having an opening on two opposing sides, sized to allow said vehicle to pass therein;
    an inner section, attached to said outer section;
    a door on a portion of an exterior wall of said inner section, said door communicating said inner section with one of said two opposing sides of said outer portion, thereby allowing said vehicle to pass through said outer portion into said inner portion; and
    an experiment module, in said inner section, for offloading an experiment module from said vehicle and loading a new experiment module onto said vehicle when said vehicle is positioned in said garage.

15. An inflatable garage for storing or docking a rover, comprising:
    walls made of a self-rigidizing material,
    an inflator for inflating said garage upon deployment at a desired location, the inflator including an inflation gas in a sealed container that makes the self-rigidizing material more rigid;
    an outer section, enclosed by a top portion and at least two side portions, said outer section having an opening on two opposing sides, sized to allow said rover to pass therein;
    an inner section, attached to said outer section;
    a door on a portion of an exterior wall of said inner section, said door communicating said inner section with one of said two opposing sides of said outer portion, thereby allowing said vehicle to pass through said outer portion into said inner portion;
    a first communication system for communicating between said rover and said garage;
    a second communication system for communicating between an Earth-based remote control station and at least one of said garage and said rover;
    a heating and cooling system for providing a proper temperature of between about 40 degrees and about 70 degrees Fahrenheit for storing said rover;
    solar panels disposed over at least a portion of an exterior surface of said garage;
    an energy storing system for storing electrical energy generated by said solar panels;
    a power box for connecting said rover to electrical energy either from said solar panels or from said energy storing system;
    a roof portion of said garage having at least one solar wing panel section attached thereto, wherein when said garage is inflated, said solar wing panel section provides additional solar panel surface area;
    area sensors to detect the location of said vehicle and guide said vehicle to said garage when said vehicle completes a mission;
    guidance sensors for guiding said vehicle inside of said garage; and
    precision sensors for accurately position said vehicle at a predetermined position inside said garage.

16. The garage according to claim 15, further comprising:
    an experiment section, in said inner section, for offloading an experiment module from said vehicle and loading a new experiment module onto said vehicle when said vehicle is positioned in said garage.

* * * * *